United States Patent [19]

Schröter et al.

[11] Patent Number: 4,913,556

[45] Date of Patent: Apr. 3, 1990

[54] MIXING APPARATUS FOR THERMOPLASTIC SYNTHETIC RESIN

[75] Inventors: Bernd Schröter, Troisdorf-Sieglar; Wilfried Schwarz, Königswinter; Richard Fellmann, Lohmar-Krahwinkel; Hans-Joachim Bartels, Troisdorf-Spich, all of Fed. Rep. of Germany

[73] Assignee: Reifenhauser GmbH & Co. Maschinenfabrik, Troisdorf, Fed. Rep. of Germany

[21] Appl. No.: 396,806

[22] Filed: Aug. 21, 1989

Related U.S. Application Data

[63] Continuation of Ser. No. 159,096, Feb. 23, 1988, abandoned.

[30] Foreign Application Priority Data

Feb. 27, 1987 [DE] Fed. Rep. of Germany ....... 3706413

[51] Int. Cl.$^4$ ............................ B01F 7/12; B01F 7/08; B29B 7/42
[52] U.S. Cl. ................................ 366/305; 366/79; 366/99; 366/307; 425/209
[58] Field of Search ................ 366/79, 90, 98, 99, 366/279, 303, 305, 307, 318, 81, 319; 425/207, 208, 209

[56] References Cited

U.S. PATENT DOCUMENTS

| | | | |
|---|---|---|---|
| 4,253,771 | 3/1981 | Renk | 366/318 |
| 4,416,548 | 11/1983 | Carre et al. | 366/303 X |
| 4,419,014 | 12/1983 | Gale | 366/30 X |
| 4,421,413 | 12/1983 | Sekiguchi | 366/307 |
| 4,479,884 | 10/1984 | Clarke et al. | 366/99 X |
| 4,501,498 | 2/1988 | McKelvey | 366/79 X |
| 4,517,107 | 5/1985 | Clarke et al. | 366/99 X |

FOREIGN PATENT DOCUMENTS

| | | |
|---|---|---|
| 0048590 | 12/1983 | European Pat. Off. |
| 930339 | 7/1963 | United Kingdom |
| WO8501911 | 5/1985 | World Int. Prop. O. |

Primary Examiner—Harvey C. Hornsby
Assistant Examiner—Scott J. Haughland
Attorney, Agent, or Firm—Herbert Dubno

[57] ABSTRACT

A rotor and stator mixing system has mixing-chamber recesses in the outer periphery of the rotor and inner periphery of the stator which are generally similar, arrayed in peripheral and axial rows and are mutually axially offset. The guide radius R of the semicircular ends of each elongated recess is also the trough radius thereof and the trough depth is less than this guide radius. The length L of the mixing chambers is three to four times the guide radius, the web width between the recesses of each circumferential row is less than half the guide radius and the shear gap width W is so selected that the shear velocity which is realized is sufficient for effective mixing by a shear action.

3 Claims, 2 Drawing Sheets

MIXING APPARATUS FOR THERMOPLASTIC SYNTHETIC RESIN

This is a continuation of co-pending application Ser. No. 159,096, filed on Feb. 23, 1988, now abandoned.

FIELD OF THE INVENTION

Our present invention relates to a mixing apparatus for synthetic resins and particularly thermoplastic synthetic resins and, more specifically, to a mixing apparatus which utilizes shear action between two relatively rotating parts defining a shear gap between them.

BACKGROUND OF THE INVENTION

It is known to associate shear-action mixing devices with worms or extruder units so that the shear action of the mixer can contribute to the homogeneity of a thermoplastic synthetic resin which emerges from the mixer.

A mixing apparatus for thermoplastified synthetic resins or thermoplastifiable synthetic resins can comprise an elongated stator receiving an elongated rotor which is rotatable about a common axis of the stator and rotor and which together define a gap, referred to herein as the shear gap. To promote the mixing action, the outer periphery of the rotor and the inner periphery of the stator can be provided with circumferential rows of angularly equispaced mixing chambers in the form of recesses opening at the respective periphery and also lying in axially spaced relationship in axial rows.

The recesses of the stator and the rotor may have similar outlines and can be elongated in the axial direction. Each recess may have a pair of opposite ends, referred to as a front end and a rear end, respectively, which may be semicircular in shape and are defined by a guide radius (R).

It is known to provide the numbers of mixing chambers in the corresponding peripheral rows of the rotor and stator so that they are the same and the number of mixing chambers in the axially extending rows to correspond to the number of mixing chambers of the axially extending rows of the rotor, and to offset the peripheral rows of mixing chambers of the rotor with respect to the peripheral rows of the stator by about half the length of the mixing chambers.

Apparatus of this type is commonly mounted on a worm-type extrusion press in which the thermoplastic synthetic resin is plastified, to further homogenize this material at the outlet of the worm press, in which case the rotor can be connected to and driven with the worm, or can be provided as an intermediate stage or section along the length of the worm extrusion press.

The stator can be constituted as rings or sleeves (bushings) which can be received in a cylinder.

Reference may be made herein to mixing-chamber recesses which are identical. While, for the most part, the mixing-chamber recesses, especially of the rotor but also of the stator, will be formed in a cylindrical wall of the respective part, generally at the ends of the rotor, the latter may deviate from the cylindrical, thereby requiring some difference between the mixing-chamber recesses at such ends from the mixing-chamber recesses along the remainder of the body of the rotor.

It thus is within the framework of the invention to allow front and end mixing-chamber recesses to deviate in configuration and dimensions in accordance with the geometry of the rotor or stator, especially when the rotor or stator has frustoconical portions at one or the other end, forming transition pieces between the rotor and the extruder worm.

In a known mixer construction of this type (see WO 85/91911), the mixing chambers of the rotor are deeper than those of the stator. In a radial cross section, these mixing-chamber recesses are arcuate but there is no specific relationship between the radius of curvature of the cross section of the recess to the guide radius previously mentioned.

In practice, the mixing efficiency, defined as the quotient between the homogenization achieved and the energy used, is generally unsatisfactory. The extrudate shows unmixed or poorly mixed cells.

The problem is even more pronounced when the device is used for mixing additives into the thermoplastic synthetic resin.

Other configurations of the mixing chambers have been used as well. For example, in the U.K. patent 930 339, the mixing chambers have a rectangular to trapezoidal configuration in radial section.

European patent EP 00 48 590 suggests that the mixing chambers should be hemispherical in configuration, with the mixing chambers not only of the rotor and stator being offset, but being offset as well along the rotor and the stator, respectively.

The increase in offsetting and the hemispherical configuration of the mixing chambers does improve the mixing, but only at the expense of an increased energy consumption.

OBJECTS OF THE INVENTION

It is, therefore, the principal object of the present invention to provide a mixing device for the purposes described which will have improved mixing efficiency and will likewise provide improved mixing effectiveness with relatively low energy consumption.

Another object of the invention is to provide a mixing unit having a stator and rotor as described, which can be fabricated economically and also provides excellent mixing efficiency.

SUMMARY OF THE INVENTION

These objects and others which will become apparent hereinafter are achieved, in accordance with the invention in a mixing apparatus for thermoplastic synthetic resin which comprises:

a stator extending along an axis, and a rotor extending along the axis and rotatable about the axis relative to the stator, the stator having an inner surface closely juxtaposed with an outer surface formed in the stator, the rotor and the stator each being formed with respective arrays of circumferentially spaced mixing-chamber recesses lying in respective circumferential rows in the outer surface and the inner surface, respectively, with the mixing-chamber recesses in each surface lying in axially spaced relationship in respective axially extending rows, recesses of each axially extending row of the rotor inwardly of ends of the respective axially extending row being identical in geometrical shape to corresponding recesses of the stator, each of the recesses at least inwardly of ends of the corresponding axially extending rows being formed with generally semicircular ends of a guide radius (R) and being elongated in axial direction with a length (L), the numbers of mixing-chamber recesses around the peripheries of the rotor and stator being the same in the respective circumferential rows, the mixing-chamber recesses of the rotor opening toward the mixing-chamber recesses of the stator, the circumferential rows of the rotor and stator being axially offset from one another by about one-half the length (L) of the mixing-chamber recesses, and wherein:

each mixing-chamber recess has a trough-shape with the cross section of a circular segment with a radius of curvature equal to the guide radius (R) and a trough depth (T) smaller than the guide radius (R), the length (L) of the mixing-chamber recesses is three to four times the guide radius (R), the mixing-chamber recesses of each circumferential row are separated by webs of a web width (B) which is less than half the guide radius (R), and the shear gap between the surfaces of the rotor and stator is selected to have a shear-gap width (W) dimensioned to generate a high shear velocity promoting mixing of the thermoplastic synthetic resin.

According to the invention, therefore, the mixing chambers are trough-shaped recesses with circular arc-segment configurations in radial section and with trough radii which correspond to the guide radius (R), while the trough depth is smaller than the guide radius. The mixing chambers have lengths which are three to four times the guide radius, while the webs between the mixing chambers at the surfaces of the rotor and stator, have a web thickness which is less than half the guide radius.

Moreover, the shear gap between the rotor surface and the stator surface is so selected that a sufficiently large shear velocity is realized.

The reference to a "guide radius" is intended to signify that this radius imparts a geometry to the trough-shaped recess which effects the flow or guide properties of the thermoplastic synthetic resin through the apparatus.

Surprisingly, when one selects a guide radius so that it may improve the flow of the thermoplastic synthetic resin through the mixer, one also finds that there is an associated improvement in the mixing efficiency.

In its plastified state, therefore, the thermoplastic synthetic resin in effect constitutes a liquid, although a liquid of a specialized kind.

The rheology and flow characteristics of thermoplastified synthetic resins is very complicated (see Schenkel "Kunststoff-Extrudertechnik", 1963, p 93 to 104).

The thorough mixing of an easily flowing liquid or a gas is especially intensive when the flow is a turbulent flow.

With thermoplastified synthetic resins, the turbulence formation is precluded by the high viscosity of the material.

Nevertheless and quite surprisingly, in accordance with the principles of the invention, a thorough mixing is achieved analogous to that which results from homogeneous isotropic turbulence in a gas or an easily flowing liquid.

This is a result of the special geometry.

In the apparatus of the invention, the mixing chambers are arranged with a high degree of ordering. Their geometries, however, are determined by the guide radius. This applies not only to the trough bottom but also to the length of each mixing-chamber recess.

For varying viscosities of the project to be mixed, different shear gap widths are found to be desirable, but this is readily determinable in an empirical manner without special effort. What is surprising and is important to the invention is that the thermoplastified synthetic resin does not appear to remain in the recesses.

The turbulence is a stability problem. It arises under certain characteristic parameters of the system. In this manner turbulence can be compared to a resonance phenomenon.

Apart from resonance oscillation, the physicist is usually concerned also with forced vibration. By analogy, one can conceive of the development of a forced turbulence based upon particular boundary conditions and it has indeed been found that the length of the mixing chamber and the manner in which each recess is rounded in relation to the guide radius have special significance with respect to the ability to generate a force turbulence even in a viscous medium like the thermoplastified synthetic resin.

Preferably the mixing chambers are spaced apart in the axial direction by a third of the guide radius.

For the most common synthetic resins now subjected to thermoplastification, it has been found to be advantageous to make the guide radius some one-tenth to one-fifth times the diameter D of the rotor, preferably about 0.15 times this diameter.

For a rotor of a diameter of D of 100 mm, therefore the guide radius should be between 10 and 20 mm, and preferably about 15 mm.

The length of the mixing chambers can vary within the range stated earlier and preferably the length is greater as the depth of the troughs is less.

According to another feature of this invention, the stator is provided with heating mans, preferably for a zone-wise heating to bring the mixing temperature to an appropriate temperature for the thermoplastic synthetic resin. This permits the viscosity to be controlled and maintained during the mixing process.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
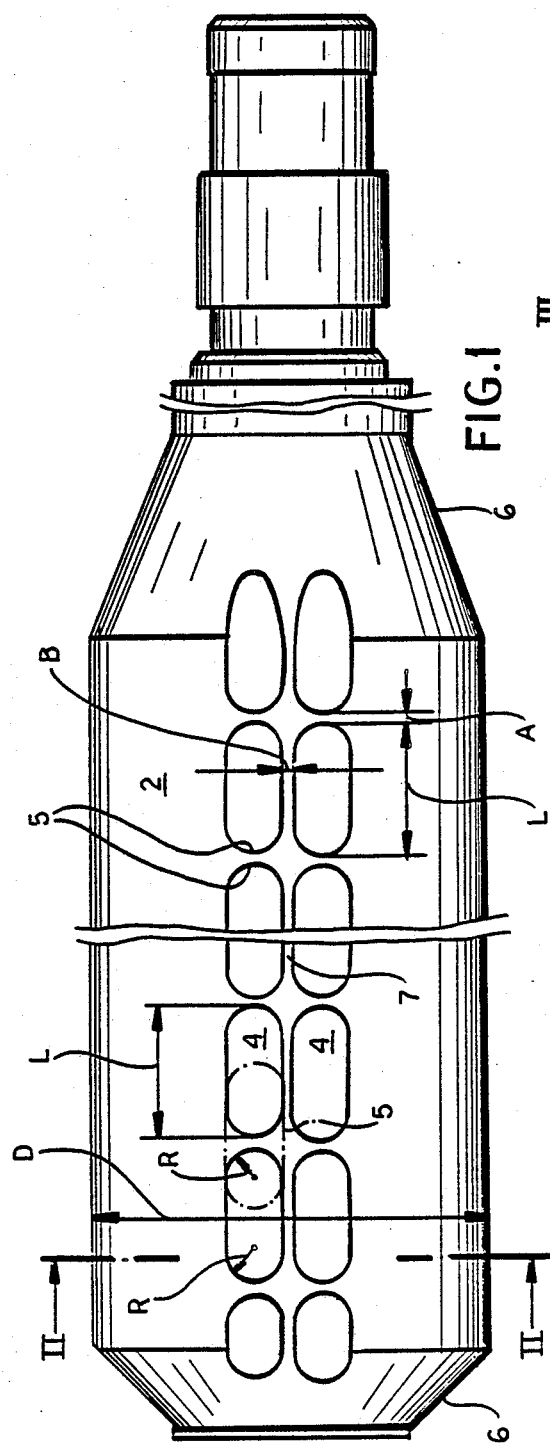
FIG. 1 is a side elevational view of a rotor according to the invention.

The apparatus shown in the drawing can be connected to a worm-type extrusion press or can be provided along the extrusion worm, i.e. can be flanked between two worm segments in an extrusion press of a so-called extruder.

The apparatus comprises a stator 1 and a rotor 2. The diameter of the stator 1 and the rotor 2 can be greater than the worm diameter or the cylinder diameter of the worm-type extrusion press, respectively.

The device serves to mix the thermoplastified synthetic resin to increase its homogeneity or to mix the thermoplastified synthetic resin with additives and other synthetic resins or the like.

Figure 5:
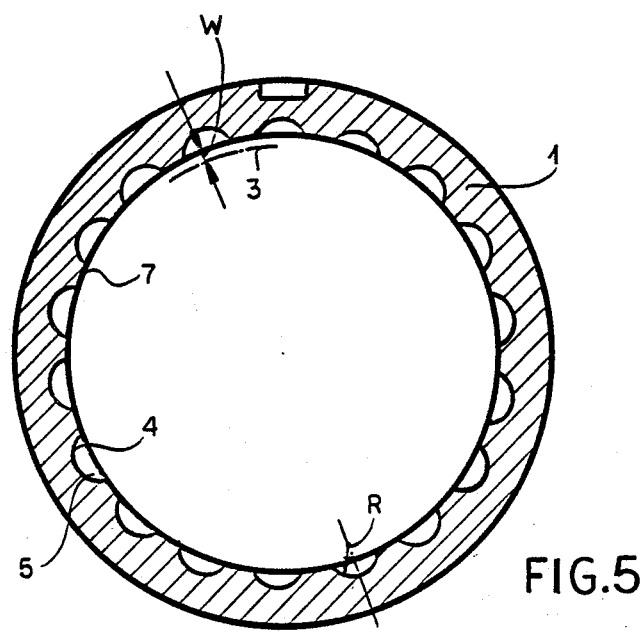
FIG. 5 is a section taken along the line V—V of FIG. 4.

The rotor 2, which can be driven by or with the worm and therefore is not shown to have any other drive, forms a shear gap 3 with the inner periphery of the stator, the shear gap having a width as indicated in FIG. 5.

The rotor 2, which can be driven by or with the worm and therefore is not shown to have any other drive, forms a shear gap 3 with the inner periphery of the stator, the shear gap having a with W as indicated in FIG. 5.

The rotor 2 and the stator 1, along their outer and inner peripheries, respectively, and in their respective peripheral surfaces, are formed with circumferential rows of angularly equispaced mixing-chamber recesses 4 which respectively open toward the aforementioned surfaces. These recesses may also be referred to simply as "mixing chambers" herein.

The mixing chambers 4 of the peripheral rows are also aligned with the mixing chambers of adjoining peripheral rows in respective axial rows of spaced-apart mixing chambers, the separation of the mixing chambers in each axially extending row being referred to as the axial separation.

Each of the mixing chambers 4 is elongated in the axial direction and thus has flanks 5 which extend in the axial direction. In addition, each recess is terminated at each axial end by a semicircle which has a radius of curvature equal to the guide radius R which can be the same radius of curvature as the curvature of each end of the recess dipping to the bottom of the trough which the recess forms. The end of each recess, therefore, corresponds approximately to a quarter spherical segment of radius of curvature R.

All of the mixing chambers 4 of the stator and the rotor are of identical geometric configuration, with the exception of terminal ones of these recesses at opposite ends of each axial row, where the recesses are formed in frustoconical portions 6 of the rotor 2 and the stator. In these regions, the configuration of the chambers may differ from the configuration of the chambers in the cylindrical body portion of the rotor and stator respectively.

The number of mixing chambers 4 in each circumferential row and each axial row of the rotor 2 is the same as the number of mixing chambers of each circumferential row and axial row of the stator 1.

As can be seen in dot-dash lines in FIG. 1, the circumferential rows of the recesses of rotor 2 are offset relative to the circumferential rows of recesses 4 of stator 1 by about half the length L of the mixing chambers in the axial direction.

Figure 4:
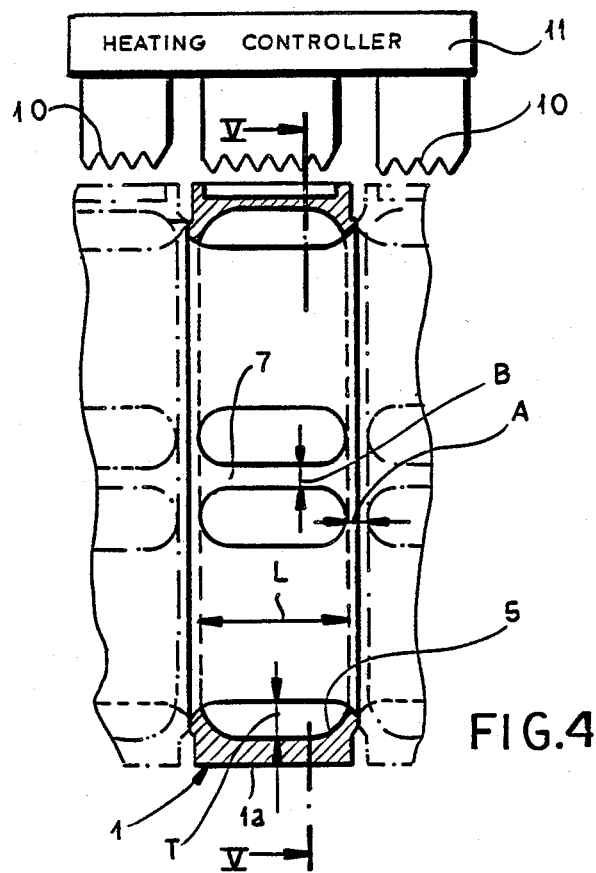
FIG. 4 is a view which has been enlarged with respect to the scale of FIGS. 1 and 2 representing a longitudinal section through the rotor.

A Comparison of FIGS. 1 and 4 shows that each mixing chamber 4 not only has an outline which is formed at its front and rear ends by the aforementioned semicircle of guide radius R, but also is elongated with a length L which is from three to four times the guide radius R (L=3R to 4R).

Figure 2:
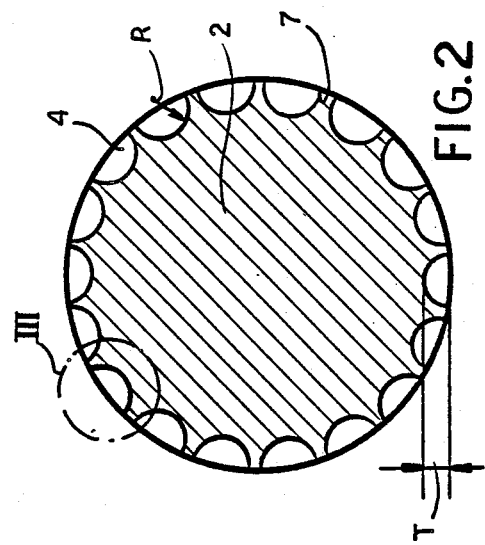
FIG. 2 is a section taken along the line II—II of FIG. I.

From FIGS. 2 and 5 moreover, it will be apparent that in cross section, the mixing-chamber recesses 4 are trough-shaped with circular arc segmental radial sections with a trough radius equal to the guide radius R.

Figure 3:
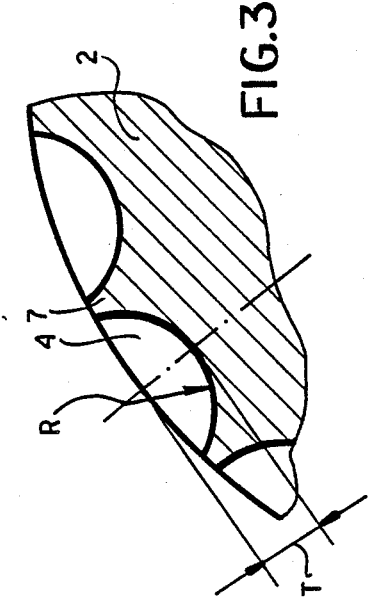
FIG. 3 is a detail view of the region shown at III in FIG.

Even the trough depth T is dependent upon the guide radius and specifically from FIG. 3 it can be seen that the trough depth is less than the guide radius R, (T<R).

In a best mode embodiment of the invention, L=50 mm.

The webs 7 between mixing chambers 4 in the surface of the rotor 2 and the stator 1 have web widths B which is less than half the guide radius R, (B<R/2).

The shear gap width W is smaller than R/2 and preferably less than R/4.

From FIGS. 1 and 4, moreover, it will be apparent that the mixing chambers 4 have in the axial direction a spacing A of about a third of the guide radius (A=R/3). In the best mode embodiment of the invention, the diameter D of the rotor 2 is about 100 mm, the guide radius R is always 10 to 20 mm, preferably about 15 mm and the length L and the trough depth T are appropriately selected in accordance with the aforementioned relationships with the understanding that as the length L of the chambers increases, the depth T of the troughs can be decreased and vice versa.

As will be apparent from FIG. 4, moreover, the stator 1 can be assembled from rings or ring segments 1a inserted in a cylinder and each ring can be provided with a heater 10 connected to a heating controller 11 which permits zonewise heating of the various stator sections to allow the thermoplastified synthetic resin to be brought to or held at a predetermined mixing temperature.

We claim:

1. A device for mixing thermoplastic synthetic resin, comprising:

a stator extending along an axis, and a rotor extending along said axis and rotatable about said axis relative to said stator, said stator having an inner surface closely juxtaposed with an outer surface formed on said rotor, said rotor and said stator each being formed with respective arrays of circumferentially spaced mixing-chamber recesses lying in respective circumferential rows in said outer surface and said inner surface, respectively, with the mixing-chamber recesses in each surface lying in axially spaced relationship in respective axially extending rows, recesses of each axially extending row of the rotor inwardly of ends of the respective axially extending row being identical in geometrical shape to corresponding recesses of the stator, each of said recesses at least inwardly of ends of the corresponding axially extending rows being formed with generally semicircular ends of a guide radius (R) and being elongated in axial direction with a length (L), the numbers of mixing-chamber recesses around the peripheries of said rotor and stator being the same in the respective circumferential rows, the mixing-chamber recesses of said rotor opening toward the mixing-chamber recesses of said stator, the circumferential rows of the rotor and stator being axially offset from one another by about one-half the length (L) of said mixing-chamber recesses, and wherein:

each mixing-chamber recess has a trough-shape with the cross section of a circular segment with a radius of curvature equal to the guide radius (R) and a trough depth (T) smaller than the guide radius (R), the length (L) of said mixing-chamber recesses is three to four times the guide radius (R), the mixing-chamber recesses of each circumferential row are separated by webs of a web width (B) which is less than half the guide radius (R), the shear gap between said surfaces of the rotor and stator is selected to have a shear-gap width (W) dimensioned to generate a high shear velocity promoting mixing of the thermoplastic synthetic resin, and the mixing chambers of the axially extending rows are axially spaced by a distance (A) which is about one third of the guide radius (R), said rotor having a diameter of about 100 mm, said guide radius being about 15 mm; and means for heating the stator to a predetermined mixing temperature controllable for the thermoplastic synthetic resin to be mixed.

2. The device defined in claim 1 wherein for mixing-chamber recesses of lesser depth, the lengths thereof are greater.

3. The device defined in claim 1 wherein said means for heating is constructed and arranged to heat said stator in a zonewise manner.

* * * * *